(12) United States Patent
Yoshida

(10) Patent No.: US 9,372,464 B2
(45) Date of Patent: Jun. 21, 2016

(54) SHEET CONVEYANCE DEVICE, IMAGE READING DEVICE, AND IMAGE FORMING APPARATUS

(71) Applicant: KYOCERA Document Solutions Inc., Osaka (JP)

(72) Inventor: Takeshi Yoshida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/787,605

(22) PCT Filed: Mar. 26, 2014

(86) PCT No.: PCT/JP2014/058622
§ 371 (c)(1),
(2) Date: Oct. 28, 2015

(87) PCT Pub. No.: WO2014/192395
PCT Pub. Date: Dec. 4, 2014

(65) Prior Publication Data
US 2016/0116880 A1   Apr. 28, 2016

(30) Foreign Application Priority Data

May 31, 2014 (JP) ................................. 2013-115611

(51) Int. Cl.
*G03G 15/00* (2006.01)

(52) U.S. Cl.
CPC ..................................... *G03G 15/602* (2013.01)

(58) Field of Classification Search
CPC ...................................................... G03G 15/602
USPC ......................................................... 399/367
See application file for complete search history.

(56) References Cited

U.S. PATENT DOCUMENTS

| 5,461,468 | A | * | 10/1995 | Dempsey | ................. | B65H 5/00 |
| | | | | | | 271/259 |
| 5,826,155 | A | * | 10/1998 | Kobayashi | ........... | G03G 15/602 |
| | | | | | | 358/496 |
| 5,995,801 | A | * | 11/1999 | Katsuta | .................. | G03G 15/60 |
| | | | | | | 271/3.01 |
| 7,636,542 | B2 | * | 12/2009 | Washnock | ........... | G03G 15/602 |
| | | | | | | 399/367 |
| 8,587,848 | B2 | | 11/2013 | Nose et al. | | |
| 2012/0008997 | A1 | * | 1/2012 | Takata | ................. | B65H 3/0669 |
| | | | | | | 399/388 |
| 2012/0170087 | A1 | | 7/2012 | Nose et al. | | |

FOREIGN PATENT DOCUMENTS

| JP | H03-066937 U | 6/1991 |
| JP | H08-337345 A | 12/1996 |
| JP | H10-114437 A | 5/1998 |
| JP | 2001-233495 A | 8/2001 |
| JP | 2011-070106 A | 4/2011 |

OTHER PUBLICATIONS

International Search Report issued in Application No. PCT/JP2014/058622, mailed Jun. 17, 2014.

(Continued)

*Primary Examiner* — Anthony Nguyen
(74) *Attorney, Agent, or Firm* — Studebaker & Brackett PC

(57) ABSTRACT

A sheet conveyance section (1) includes a roller (3a), a roll (3b), and a pressing member (5). The roller (3a) and the roll (3b) carry a sheet (P) by sandwiching the sheet P. The pressing member (5) presses the roll (3b) against the roller (3a). The roll (3b) is supported so as to be movable independently of the pressing member (5) on condition that the pressing by the pressing member (5) is released.

11 Claims, 15 Drawing Sheets

(56) References Cited

OTHER PUBLICATIONS

Microfilm of the specification and drawings annexed to the request of Japanese Utility Model Application No. 127943/1989 (Laid-open No. 66937/1991), (Ricoh Co., Ltd.), Jun. 28, 1991, specification, p. 3, lines 14 to 16; p. 4, line 14 to p. 8, line 5; fig. 1, 2 (Family: none).

Microfilm of the specification and drawings annexed to the request of Japanese Utility Model Application No. 141381/1986 (Laid-open No. 48749/1988) (Fuji Xerox Co., Ltd.), Apr. 2, 1988, col. of Prior Art; fig. 3 (Family: none).

* cited by examiner

SHEET CONVEYANCE DEVICE, IMAGE READING DEVICE, AND IMAGE FORMING APPARATUS

TECHNICAL FIELD

The present invention relates to a sheet conveyance device, an image reading device, and an image forming apparatus each of which involves conveyance of sheets.

BACKGROUND ART

An image forming apparatus has a cassette loaded with sheets and conveys one sheet at a time from the cassette to a transfer section and a fixing section. A sheet on which an image is formed is then discharged to the outside.

An automatic document feeding apparatus conveys multiple sheets one at a time to an image reading device and discharges the sheet to the outside after an image of the sheet is read.

During conveyance of sheets, a jam may occur. A jam refers to a situation in which one or more sheets are stacked in the image forming apparatus or the automatic document feeding apparatus and cannot be discharged so that printing or reading cannot be completed. When a jam occurs, sheets that are stacked in the apparatus need to be removed.

In an example of an image forming apparatus disclosed in Patent Literature 1, when a sheet jam occurs, a user opens a guide plate to release the nip between a roll (follower roller) and a roller (drive roller). This allows the user to remove jammed sheets.

CITATION LIST

Patent Literature

[Patent Literature 1]
Japanese Patent Application Laid-Open Publication No. 2001-233495

SUMMARY OF INVENTION

Technical Problem

Unfortunately, a roll is disposed on a guide plate and therefore the relative position of the roll to a roller may be associated with variations due to factors related to the guide plate alone, such as the dimensions, warping, rigidity, and dimensional tolerances of a mounting position. When the position of the roll is deviated relative to the roller, sheets may be skewed during conveyance, which reduces the sheet conveyance performance.

The present invention is made in view of the problem noted above and aims to provide a sheet conveyance device, an image reading device, and an image forming apparatus each of which allows easy removal of sheets caught between a follower roller and a drive roller while limiting the variations in position of the follower roller.

Solution to Problem

A sheet conveyance device according to a first aspect of the present invention includes a drive roller, a follower roller, and a pressing member. The drive roller and the follower roller convey a sheet by sandwiching the sheet therebetween. The pressing member presses the follower roller against the drive roller. The follower roller is supported so as to be movable independently of the pressing member in a state in which the pressing by the pressing member is released.

An image reading device according to a second aspect of the present invention includes the sheet conveyance device according to the first aspect and an image reading section. The image reading section reads an image of a sheet conveyed by the sheet conveyance device.

An image forming apparatus according to a third aspect of the present invention includes the sheet conveyance device according to the first aspect and an image forming section. The image forming section forms an image on a sheet conveyed by the sheet conveyance device.

Advantageous Effects of Invention

According to the present invention, the follower roller is supported so as to be moveable independently of the pressing member and therefore the accuracy in position of the follower roller is not likely to be affected by the pressing member. Consequently, variations in position of the follower roller are limited, and when the pressing by the pressing member is released upon occurrence of a jam, the follower roller can be moved away from the drive roller. This allows easy removable of sheets caught between the follower roller and the drive roller.

BRIEF DESCRIPTION OF DRAWINGS

FIG. 10 is a longitudinal cross sectional view of the sheet conveyance section shown in FIG. 10 in the first state.

FIG. 12 is a longitudinal cross sectional view of the sheet conveyance section shown in FIG. 11 in the second state.

DESCRIPTION OF EMBODIMENTS

Figure 1A:
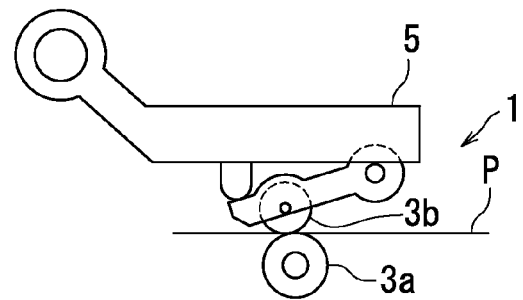
FIG. 1A schematically shows a sheet conveyance section in a first state according to Embodiment 1 of the present invention.

The following describes embodiments of the present invention with reference to the accompanying drawings. Components that are the same or equivalent are denoted by the same reference signs in the drawings and explanation thereof is not repeated.

(Embodiment 1)

[Basic Principle]

Figure 1B:
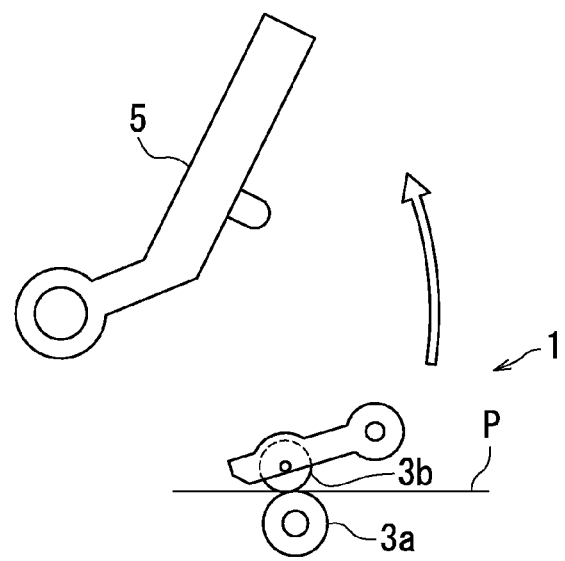
FIG. 1B schematically shows the sheet conveyance section in a second state according to Embodiment 1 of the present invention.
Figure 1C:
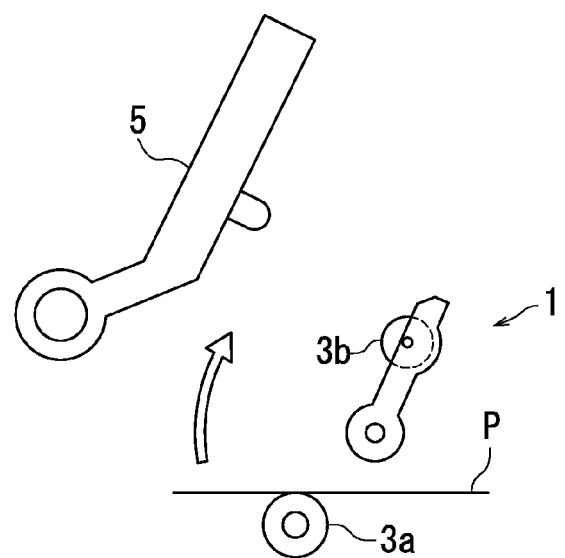
FIG. 1C schematically shows the sheet conveyance section in a third state according to Embodiment 1 of the present invention.

FIGS. 1A, 1B, and 1C each schematically show a sheet conveyance section 1 (hereinafter, "conveyance section 1") that functions as a sheet conveyance device according to Embodiment 1 of the present invention. The conveyance section 1 includes a roller 3a (drive roller), a roll 3b (follower roller), and a pressing member 5. The roller 3 and the roll 3b convey a sheet P by sandwiching the sheet P therebetween. The pressing member 5 presses the roll 3b against the roller 3a. The roll 3b is supported so as to be movable independently of the pressing member 5 in a state in which the pressing by the pressing member 5 is released (FIGS. 1B and 1C).

Since the roll 3b according to Embodiment 1 is supported so as to be movable independently of the pressing member 5, the accuracy in position of the roll 3b is not likely to be affected by the pressing member 5. Consequently, when a jam occurs, easy removal of a sheet P caught between the roll 3b and the roller 3a is ensured without causing positional deviation of the roll 3b, by releasing the pressing of the pressing member 5 and moving the roll 3b away from the roller 3a (FIG. 3C).

[First State, Second State, and Third State of Conveyance Section]

FIGS. 1A, 1B, and 1C respectively show the conveyance section 1 in a first state, a second state, and a third state. In the first state, the roll 3b is pressed against the roller 3a by the pressing member 5. In the second state, the pressing of the pressing member 5 has been released and the roll 3b is in abutment against the roller 3a. In the third state, the pressing of the pressing member 5 has been released and the roll 3b has been moved away from the roller 3a. In the present specification, the term "abutment" refers to a state in which the roll 3b and the roller 3a are in direct contact and also to a state in which the roll 3b and the roller 3a are in indirect contact via a sheet P. The same definition of the first to third states applies to those in Embodiments 2 to 4, which will be described below.

Application Example

The conveyance section 1 is applicable to a mechanism that conveys a sheet using a drive roller (roller that is driven to rotate by a drive source coupled thereto) and a follower roller (roller that rotates in accompaniment to rotation of the drive roller and may be referred to also as a roll). The conveyance section 1 may for example be installed in a document feeding section (document feeder), an image forming section, a paper feed unit (paper feeder) of an image forming apparatus. Embodiments 2 to 4 described below are directed to examples in which the conveyance section 1 is installed in a document feeding section.

Where the conveyance section 1 is installed in a document feeding section, an example of a sheet P corresponds to a sheet to be read (a sheet of an original document). Where the conveyance section 1 is installed in the image forming section, an example of a sheet P corresponds to a recording sheet on which an image is to be formed. The image forming section forms an image on a sheet P conveyed by the sheet conveyance device 1. FIGS. 2 to 14 omit illustration of a sheet P.

(Embodiment 2)

With reference to FIGS. 1 to 9, the following describes a conveyance section 1 according to Embodiment 2 of the present invention. In Embodiment 2, the conveyance section 1 is installed in a document feeding section 100 and functions as a reversing section. The reversing section is a mechanism used for double-sided reading. Therefore, each roller 3a is a reversing roller for reversing the side of a sheet S and each roll 3b is a reversing roll.

[Overview of Document Feeding Section]

Figure 2:
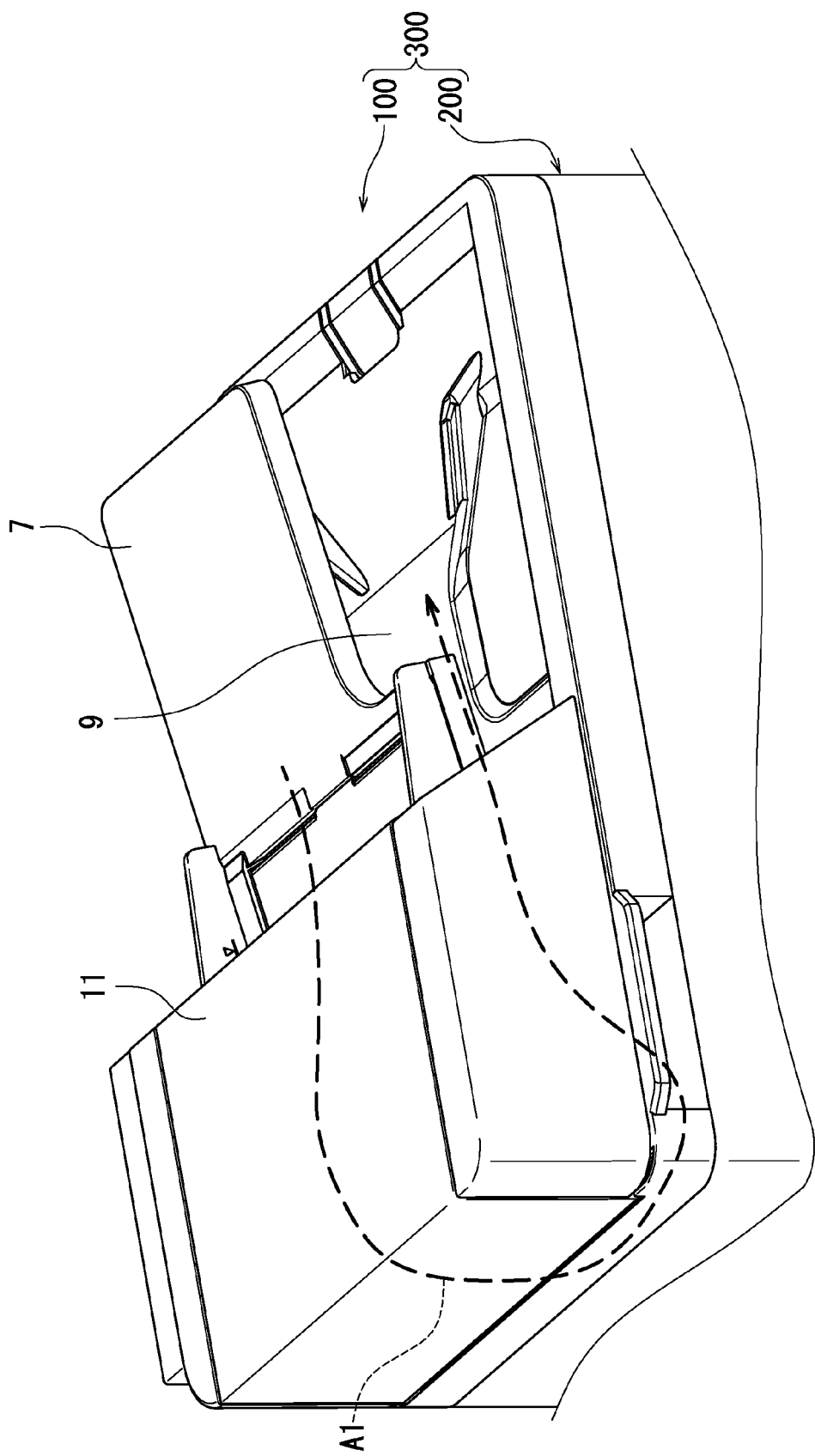
FIG. 2 is an external perspective view of a document feeding section and an image reading section, the document feeding section including a sheet conveyance section according to Embodiment 2 of the present invention.
Figure 3:
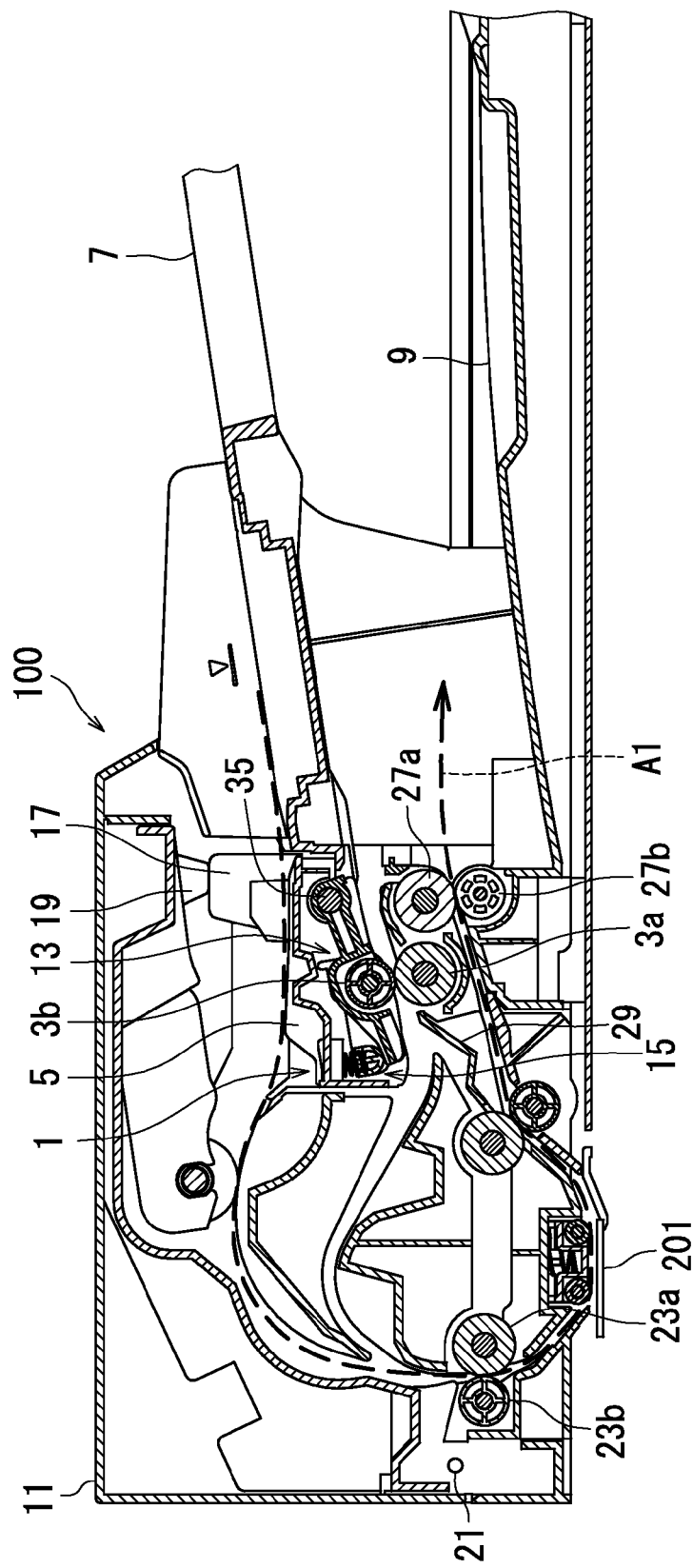
FIG. 3 is a longitudinal cross sectional view of the document feeding section performing one-sided reading.

Reference is made to FIGS. 2 and 3. FIG. 2 is an external perspective view of the document feeding section 100, which includes the conveyance section 1, and an image reading section 200. FIG. 3 is a longitudinal cross sectional view of the document feeding section 100 performing one-sided reading. The document feeding section 100 is disposed on the top of the image reading section 200. The document feeding section 100 and the image reading section 200 together make up an image reading device 300.

The document feeding section 100 includes a document table 7, an exit tray 9, and a cover 11. A sheet P is set on the document table 7. The document feeding section 100 fetches sheets P one at a time from the document table 7 and automatically conveys the sheet P toward contact glass 201. The image reading section 200 optically reads an image of the sheet P passing over the contact glass 201 to generate image data. The document feeding section 100 discharges the sheet P, which has been read, onto an exit tray 9. The conveyance path of the sheet P is indicated by an arrow A1.

The cover 11 is rotatable about a shaft 21. Consequently, the cover 11 can be opened for handling a jam or for maintenance.

[Operation of Document Feeding Section (One-Sided Reading)]

Reference is made to FIG. 3. The document feeding section 100 includes the conveyance section 1, a conveyance roller 23a, a conveyance roll 23b, an ejection roller 27a, an ejection roll 27b, and a separation guide 29. A sheet P is conveyed by the conveyance roller 23a, the conveyance roll 23b, the ejection roller 27a, and the ejection roll 27b to pass over the contact glass 201 to reach the exit tray 9 (arrow A1).

[Operation of Document Feeding Section (Double-Sided Reading)]

Figure 4:
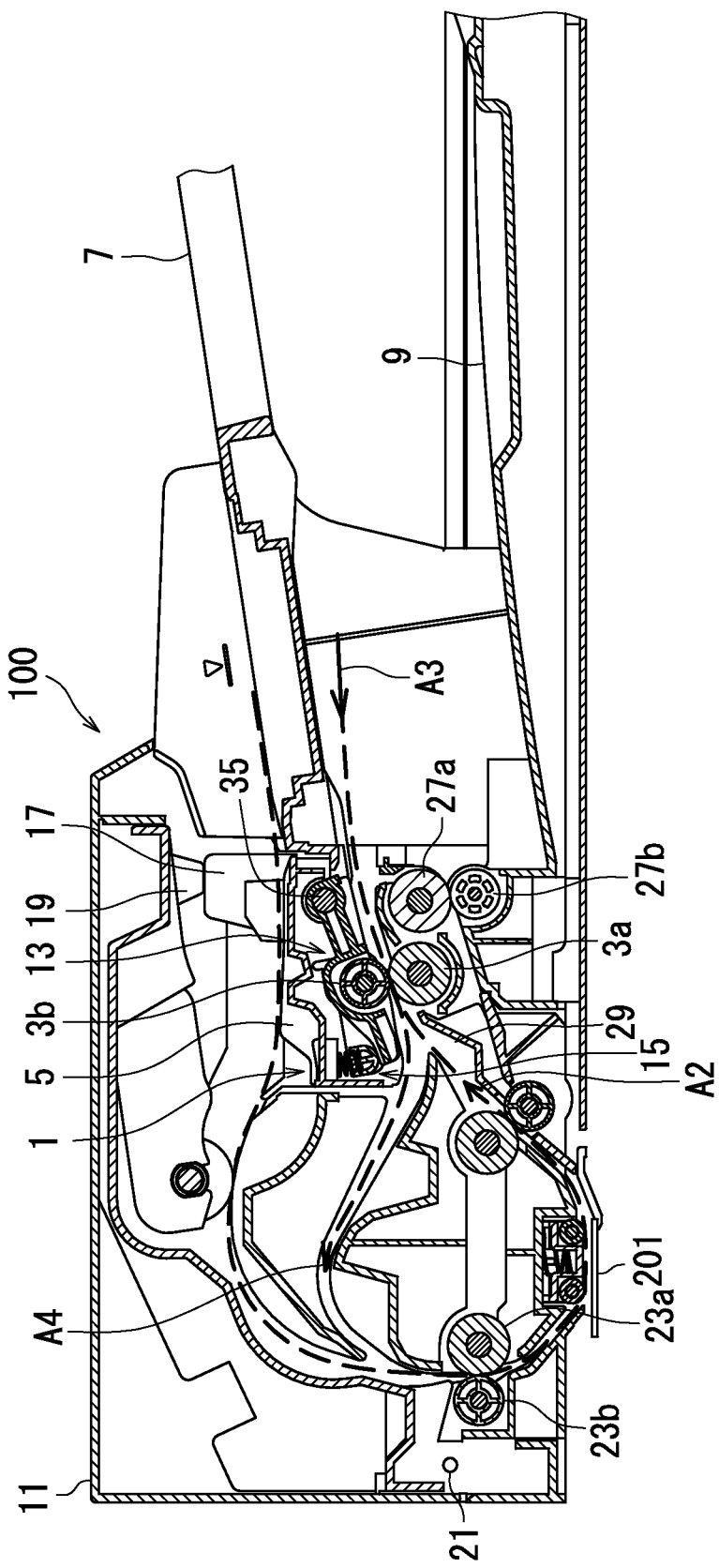
FIG. 4 is a longitudinal cross sectional view of the document feeding section performing double-sided reading.

Reference is made to FIG. 4. FIG. 4 is a longitudinal cross sectional view of the document feeding section 100 performing double-sided reading. A sheet P is conveyed by the conveyance roller 23a and the conveyance roll 23b to pass over the contact glass 201 where an image of a first side is read. Then, for reading of a rear side of the sheet P, the separation guide 29 switches the path (a tip of the separation guide 29 is lowered). As a result, the sheet P having passed over the contact glass 201 is conveyed to the conveyance section 1 (arrow A2).

Once the sheet P passes over the separation guide 29, the rollers 3a of the conveyance section 1 start rotating in a reversed direction. This causes the sheet P to be switched back (arrow A3). The sheet P is then conveyed toward the conveyance roller 23a and the conveyance roll 23b (arrow A4) to again passes over the contact glass 201 where an image of the rear side is read. Then, the sheet P again passes through the conveyance section 1 and is discharged onto the exit tray 9.

[Locations of Components of Conveyance Section]

Figure 5:
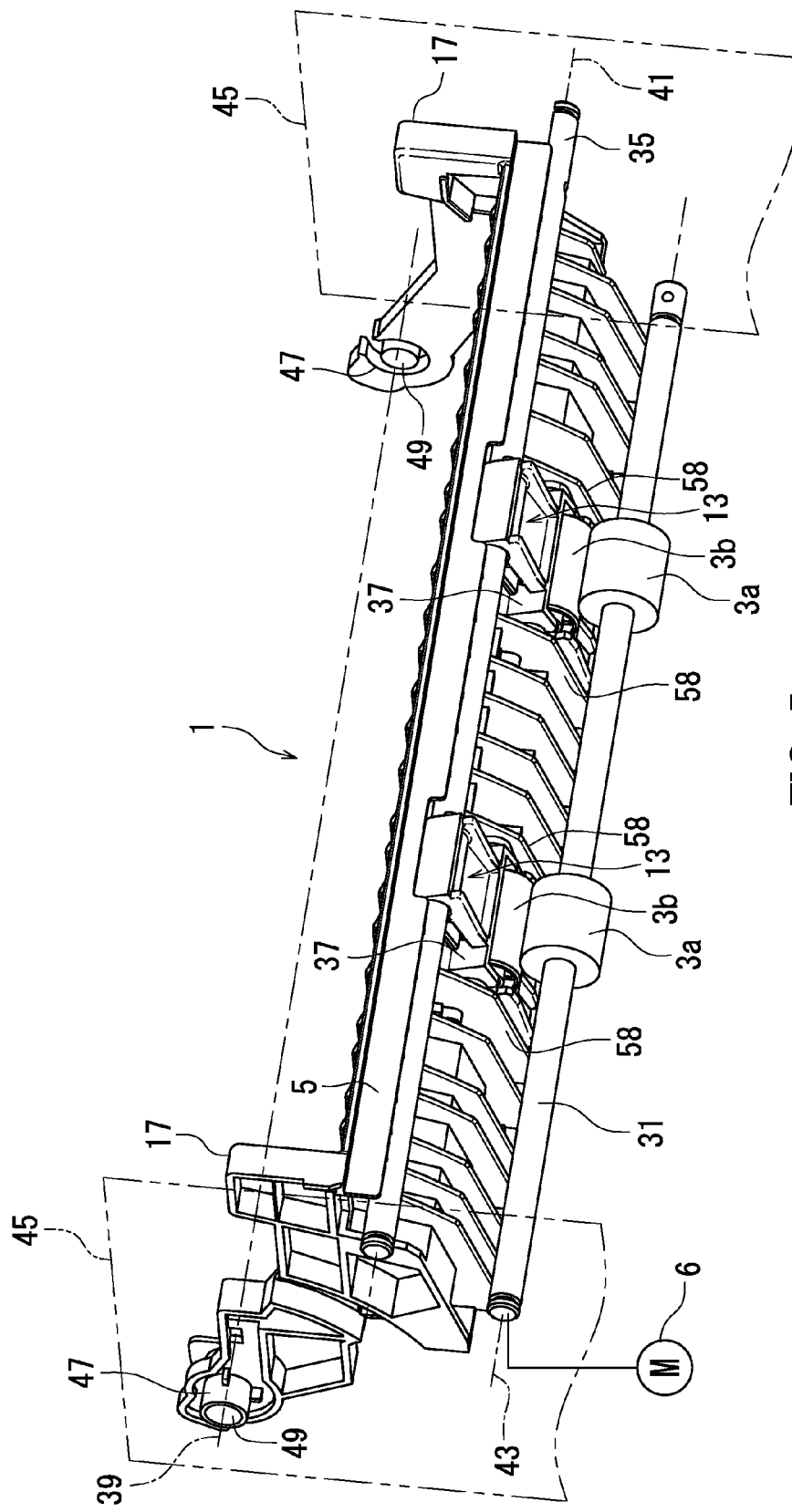
FIG. 5 is a perspective view of the sheet conveyance section shown in FIG. 4 in the first state.
Figure 6:
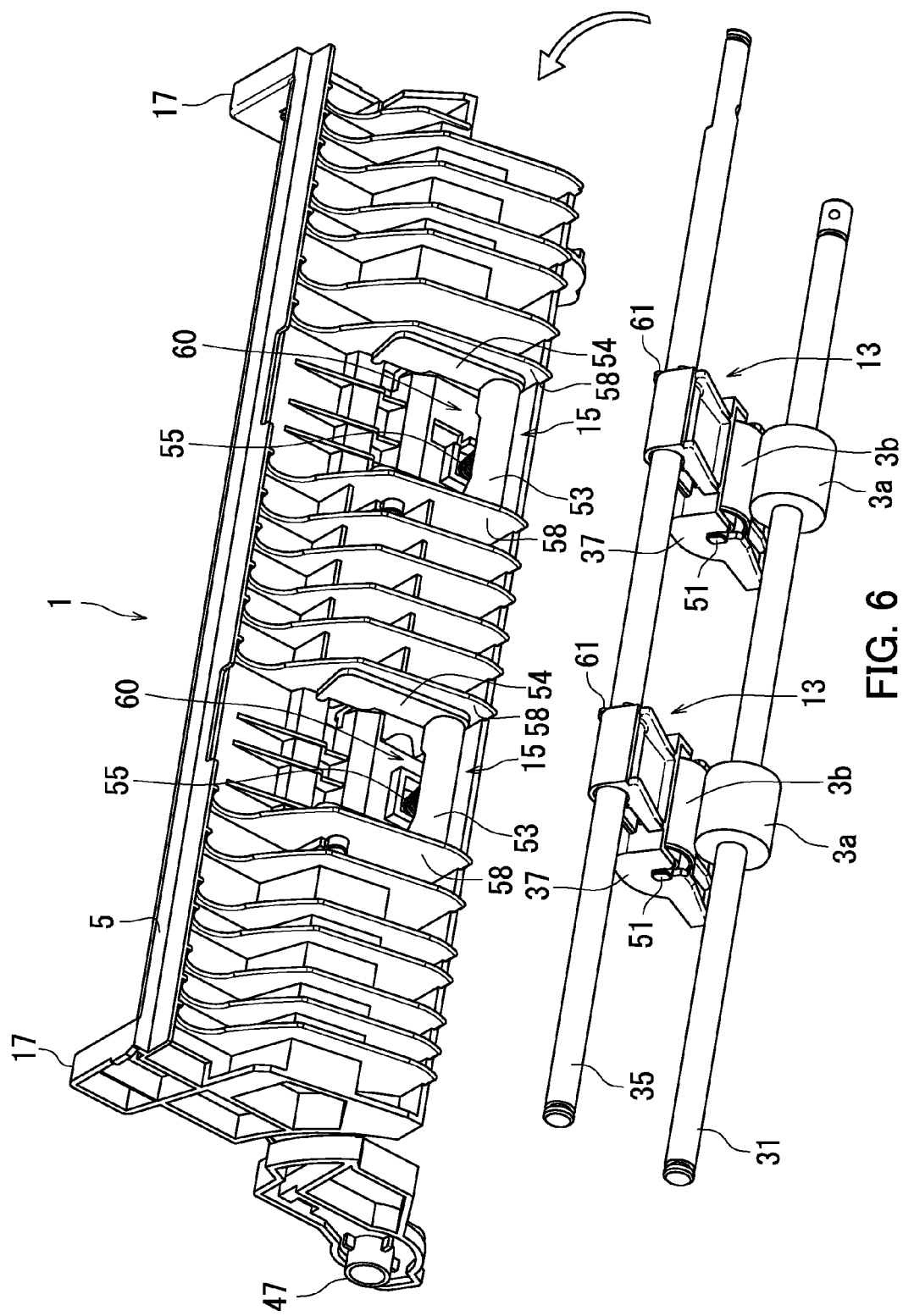
FIG. 6 is a perspective view of the sheet conveyance section shown in FIG. 4 in the second state.

Reference is made to FIGS. 4 to 6. FIG. 5 is a perspective view of the conveyance section 1 in the first state. FIG. 6 is a perspective view of the conveyance section 1 in the second state. FIG. 6 omits illustration of a frame 45, shaft portions 49, a drive source 6, and axes 39, 41, and 43.

The conveyance section 1 includes a pressing member 5, a pair of resilient units 15, a pair of roll units 13 (each of which includes one roll 3b), a support member 35 (second support member), a pair of rollers 3a, and a shaft 31. The pressing member 5 in Embodiment 2 is a guide plate, which is a member that guides a sheet P.

The rollers 3a are secured to the shaft 31 at locations a predetermined distance away from each other. The shaft 31 is rotatably supported on the frame 45. The frame 45 is disposed inside the document feeding section 100. The shaft 31 is connected to the drive source 6 (a motor, for example) for transmitting a rotation force to the shaft 31. As a result, the shaft 31 and the rollers 3a rotate about the axis 43. The drive source 6 is included in the document feeding section 100.

The pair of roll units 13 is disposed such that the pair of rolls 3b is disposed opposite to the pair of rollers 3a. The roll units 13 are secured to the support member 35. The support member 35 in Embodiment 2 is a support shaft. The support member 35 is supported on the frame 45 so as to be rotatable about the axis 41.

A bearing 47 is disposed at each opposite end of the pressing member 5. The shaft portions 49 projecting from the frame 45 are inserted into the respective bearings 47. Consequently, the pressing member 5 is rotatable about the axis 39.

The pressing member 5 has a pair of mount portions 60 on a rear surface thereof and at locations corresponding to the pair of roll units 13. Each mount portion 60 is bounded by two guide pieces 58. The resilient units 15 are disposed on the respective mount portions 60.

[Structure of Components of Conveyance Section]

Figure 7:
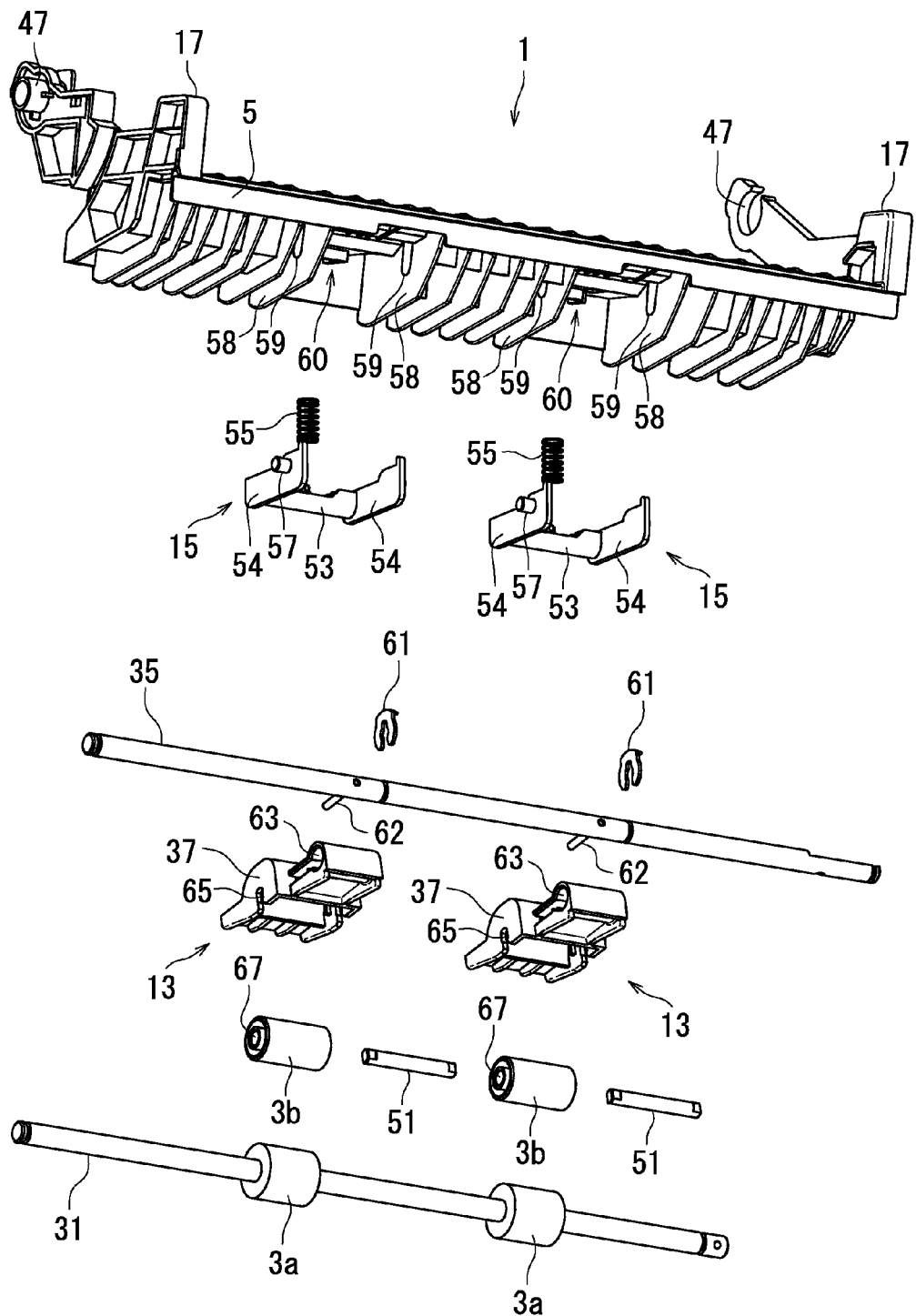
FIG. 7 is an exploded perspective view of the sheet conveyance section shown in FIG. 4.

Reference is made to FIGS. 4 to 7. FIG. 7 is an exploded perspective view of the sheet conveyance section 1. Each resilient unit 15 includes an abutting portion 53, side plates 54, and an elastic object 55. In Embodiment 2, each elastic object 55 is a spring. Each abutting portion 53 is secured between the base end portions of the two side plates 54. Each side plate 54 has a projection 57 on a lateral surface thereof.

Each resilient unit 15 is mounted on a corresponding one of the mount portions 60 of the pressing member 5. Each guide piece 58 has a U-shaped hole 59 though a lateral surface thereof. The projections 57 are inserted in the respective holes 59 with the elastic object 55 sandwiched between the rear side of the abutting portion 53 and the rear surface of the pressing member 5. The projections 57 are inserted into the holes 59 against the elastic force of the elastic object 55. Therefore, the abutting portion 53 is urged by the elastic object 55 in a direction away from the rear surface of the pressing member 5. The abutting portion 53 abuts against the distal end portion of the support member 37 of a corresponding one of the roll units 13 (see FIG. 8).

Each roll unit 13 includes a roll 3b, a shaft 51, and a support member 37 (first support member). In Embodiment 2, each support member 37 is a roll holder. The support member 37 has side surfaces each having a shaft hole 65 at a location centrally of the side surface. Each roll 3b has a cylindrical hole 67 inside. The shaft 51 is inserted through the hole 67 so as to allow the roll 3b to rotate about the shaft 51. The shaft 51 inserted through the hole 67 is secured in place with the ends of the shaft 51 inserted into the respective shaft holes 67. Each roll unit 13 is assembled in a manner described above and therefore the support member 37 can rotatably support the roll 3b.

Each support member 37 has a base end portion through which a shaft hole 63 is formed. The support member 35 is inserted though the respective shaft holes 63. The support member 35 is provided with spring pins 62 projecting therefrom, and each support member 37 receives insertion of one of the spring pins 62 on one lateral surface of the base end portion. Consequently, the support members 37 are held non-rotatable relative to the support member 35. As a result, the support member 35 rotates in accompaniment to rotation of the support members 37. In other words, the support member 35 supports each support member 37 to allow rotation about the axis 41. The support member 35 is also provided with ring-shape stoppers 61 such that each support member 37 is in contact with one of the stoppers at another lateral surface of the base end portion. As a result, the stoppers 61 and the spring pins 62 hold the roll units 13 against movement along the support member 35 in a direction of the axis 41.

[First State of Conveyance Section]

Figure 8:
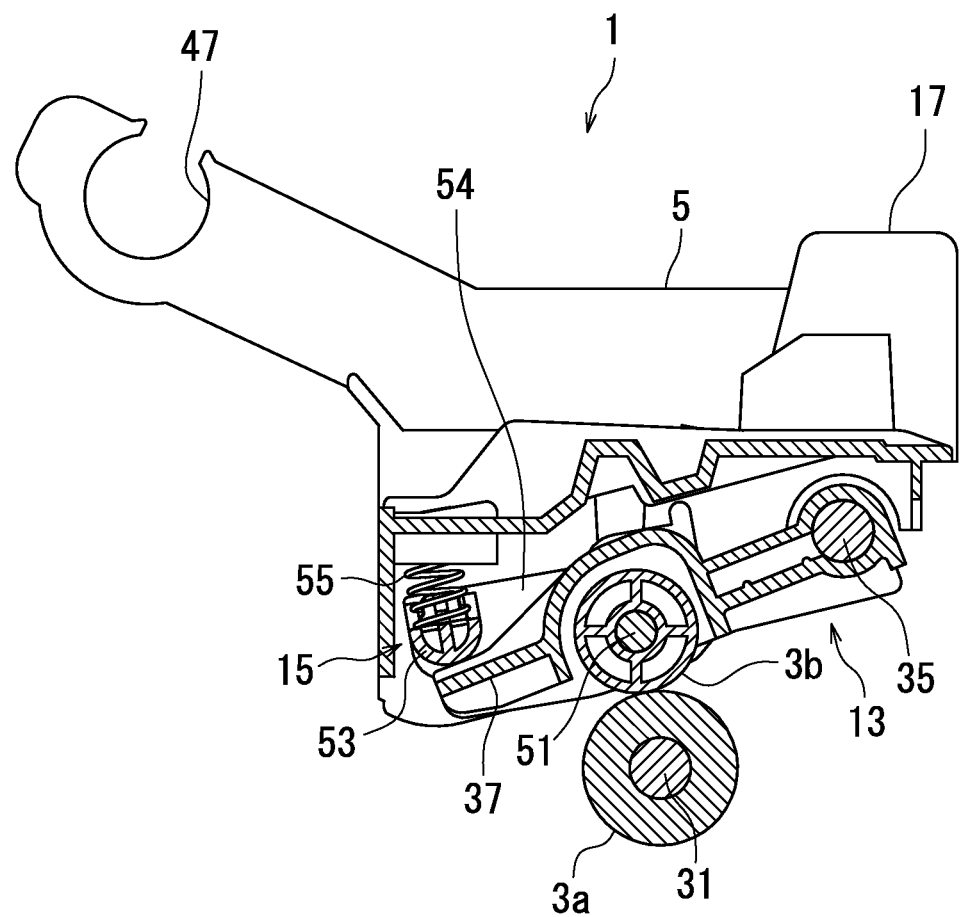
FIG. 8 is a longitudinal cross sectional view of the sheet conveyance section shown in FIG. 5 in the first state.

Reference is made to FIGS. 1A, 4, 5 and 8. FIG. 8 is a longitudinal cross sectional view of the conveyance section 1 in the first state. In a state where the cover 11 is closed, a projection 19 formed on a rear surface of the cover 11 is in abutment against the pressing member 5 at abutment target portions 17 so as to press the pressing member 5. As a result, the pressing member 5 is set in position that allows the conveyance section 1 to convey a sheet P. Since the abutting portion 53 of each resilient unit 15 is in abutment against the distal end portion of the corresponding support member 37, the support member 37 is pressed by the elastic force of the elastic object 55. When the support members 37 are pressed, the rolls 3b are pressed against the rollers 3a. As a result, each roll 3b rotates in accompaniment to rotation of the corresponding roller 3a.

In Embodiment 2, the first state may correspond to, for example, a state in which the conveyance section 1 is in standby for conveying a sheet P, a state in which the conveyance section 1 is conveying a sheet P, or a state immediately after occurrence of a jam (FIG. 1A).

[Second State of Conveyance Section]

Figure 9:
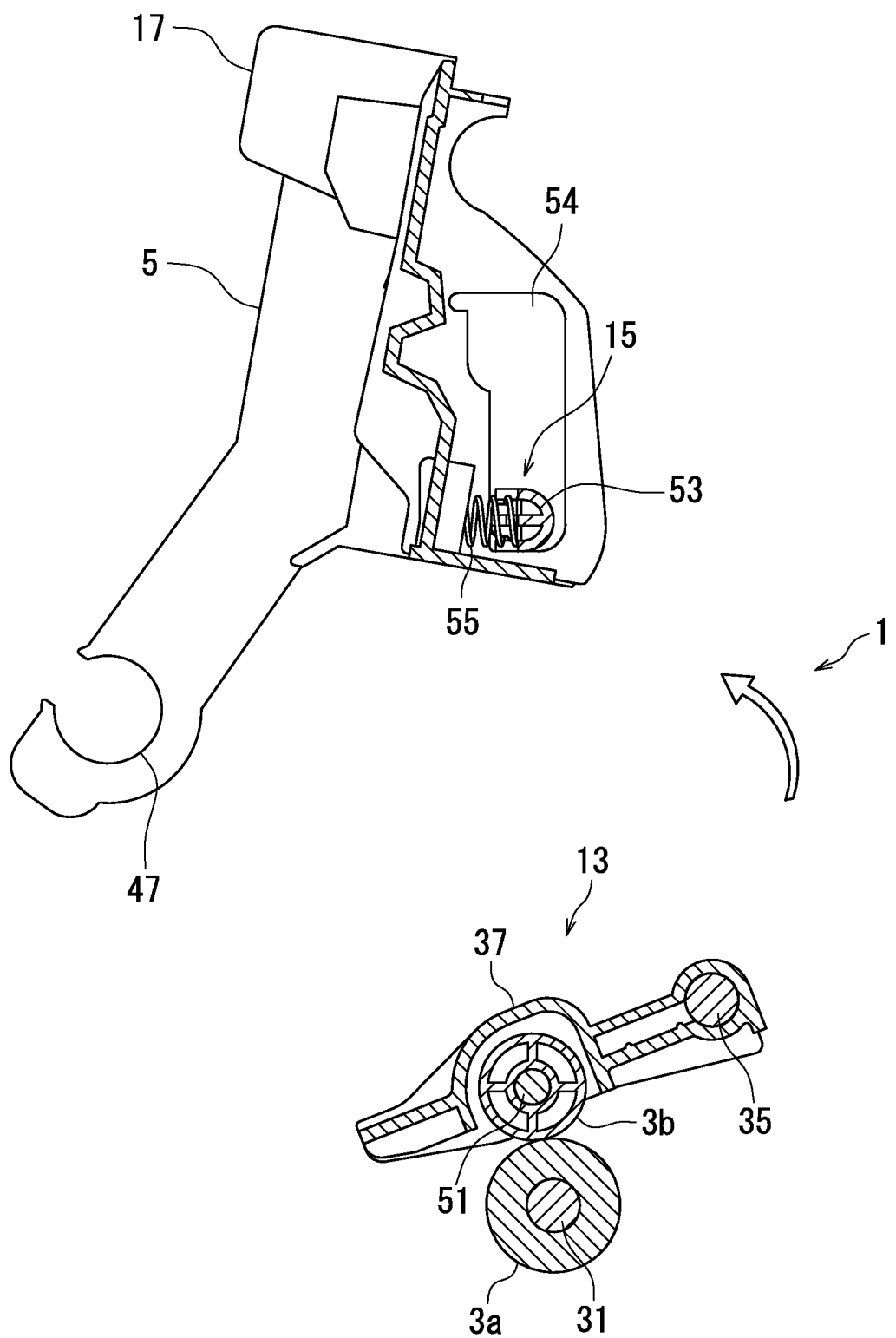
FIG. 9 is a longitudinal cross sectional view of the sheet conveyance section shown in FIG. 6 in the second state.

Reference is made to FIGS. 1B, 4, 6, and 9. FIG. 9 is a longitudinal cross sectional view of the conveyance section 1 in the second state. As the cover 11 is opened, the projection 19 is moved away from the respective abutment target portions 17 to release the pressure applied to the pressing member 5. In the state immediately after the cover 11 is opened, the abutting portions 53 of the pressing member 5 are still in abutment against the respective support members 37. Consequently, the resilient units 15 remain pressing the support members 37 under the empty weight of the pressing member 5. When the pressing member 5 is rotated to move the abutting portions 53 away from the support members 37, the pressing of the support members 37 by the resilient units 15 is released. As a result, the rolls 3b are no longer pressed against the respective rollers 3a.

In Embodiment 2, the second state may correspond to, for example, a state in which a jam has occurred, a state during maintenance, or a state in which the cover 11 and the pressing member 5 are left open (FIG. 1B).

[Third State of Conveyance Section]

Reference is made to FIGS. 1C and 9. The support member 35 supports the support members 37 such that once pressing by the pressing member 5 is released, each support member 37 is movable away from the corresponding roller 3a while the rolls 3b remain supported on the respective support members 37. In the second state, the pressing applied to the support members 37 of the respective roll units 13 has been released, and therefore the roll units 13 are rotatable with the support member 35. As the roll units 13 are rotated, the rolls 3b move away from the rollers 3a. When a jam occurs, this state allows a sheet P caught between the roller 3a and the roll 3b to be removed easily and also allows maintenance to be carried out easily.

In Embodiment 2, the third state may correspond to, for example, a state in which a jam has occurred, a state during maintenance, or a state in which the cover 11 and the pressing member 5 are left open and the roll units 13 are apart from the rollers 3a (see FIG. 1C).

As has been described with reference to FIGS. 1A to 9, the rolls 3b of Embodiment 2 are not disposed on the pressing member (guide plate) 5. Therefore, the accuracy in position of the rolls 3b is not likely to be affected by the pressing member 5. As a consequence, the positions of the rolls 3b are set with high precision, which is effective to restrict conveyance failure. The factors related to the pressing member 5 alone such as dimensions, warping, rigidity, dimensional tolerances of a mounting position result in difference in the pressing force applied to the rolls 3b. However, the difference affects less on the conveyance performance than the positional deviation between the roller 3a and the roll 3b. The positional accuracy of the rolls 3b is increased also by the configuration that a relative positional relation between each support member 35 supporting the roll unit 13 and the roller 3a is fixed.

As has been described with reference to FIGS. 5 to 9, the resilient units 15 each pressing the roll 3b against the roller 3a are disposed on the pressing member (guide plate) 5. Consequently, when the pressing member 5 is opened in an attempt to remove a sheet P to clear a jam, the pressing force applied to the rolls 3b is also released. This facilitates easy removable of the sheet S. Especially in a case where a jam occurs during conveyance of a sheet P for image reading by the document feeding section 100, care should be taken not to damage the sheet P. Embodiment 2 does not require rough handling of a sheet S for removable of the sheet S or rough handling of the roller 3a and the roll 3b to release the nip and thus is effective to prevent damage to sheets S.

In addition, as has been described with reference to FIGS. 1 and 9, when a jam occurs, the nip between the roller 3a and the roll 3b need to be released and Embodiment 2 does not require provision of a drive source for releasing the nip. This configuration is effective to allow easy removal of a sheet P to clear a jam without increasing costs.

As has been described with reference to FIGS. 5 to 9, Embodiment 2 provides the resilient units 15 each disposed between the pressing member 5 and the corresponding support member 37. In the first state, each resilient unit 15 presses (urges) the roll 3b against the roller 3a responsively to the pressing by the pressing member 5. In this state, the pressing is applied against the elastic force of the elastic objects 55. Therefore, the repellant force of the elastic objects 55 acts in the direction opposite to the pressing direction by the pressing member 5. Consequently, once the cover 11 is opened, the pressing member 5 is pushed upward by the repellant force of the elastic objects 55. This allows the pressing member 5 to be opened easily and thus sheets P to be removed easily.

As has been described with reference to FIGS. 5 to 7, Embodiment 2 provides the roll units 13 and the support members 37 each in a size commensurate with the size of the rollers 3a so as not cover the entire length of the shaft 31 to which the rollers 3a are attached. Therefore, when a jam occurs, the state of a stacked sheet P can be visually checked easily through a portion not concealed by the roll units 13.

As has been described with reference to FIGS. 3 and 4, in addition, Embodiment 2 provides the conveyance section 1 that acts as a transfer section in double-sided reading. Although a transfer section is a preferred application example of the present invention, application of the present invention is not limited to such. For example, the present invention is applicable to the conveyance roller 23a and the conveyance roll 23b shown in FIG. 4.

(Embodiment 3)

Figure 10:
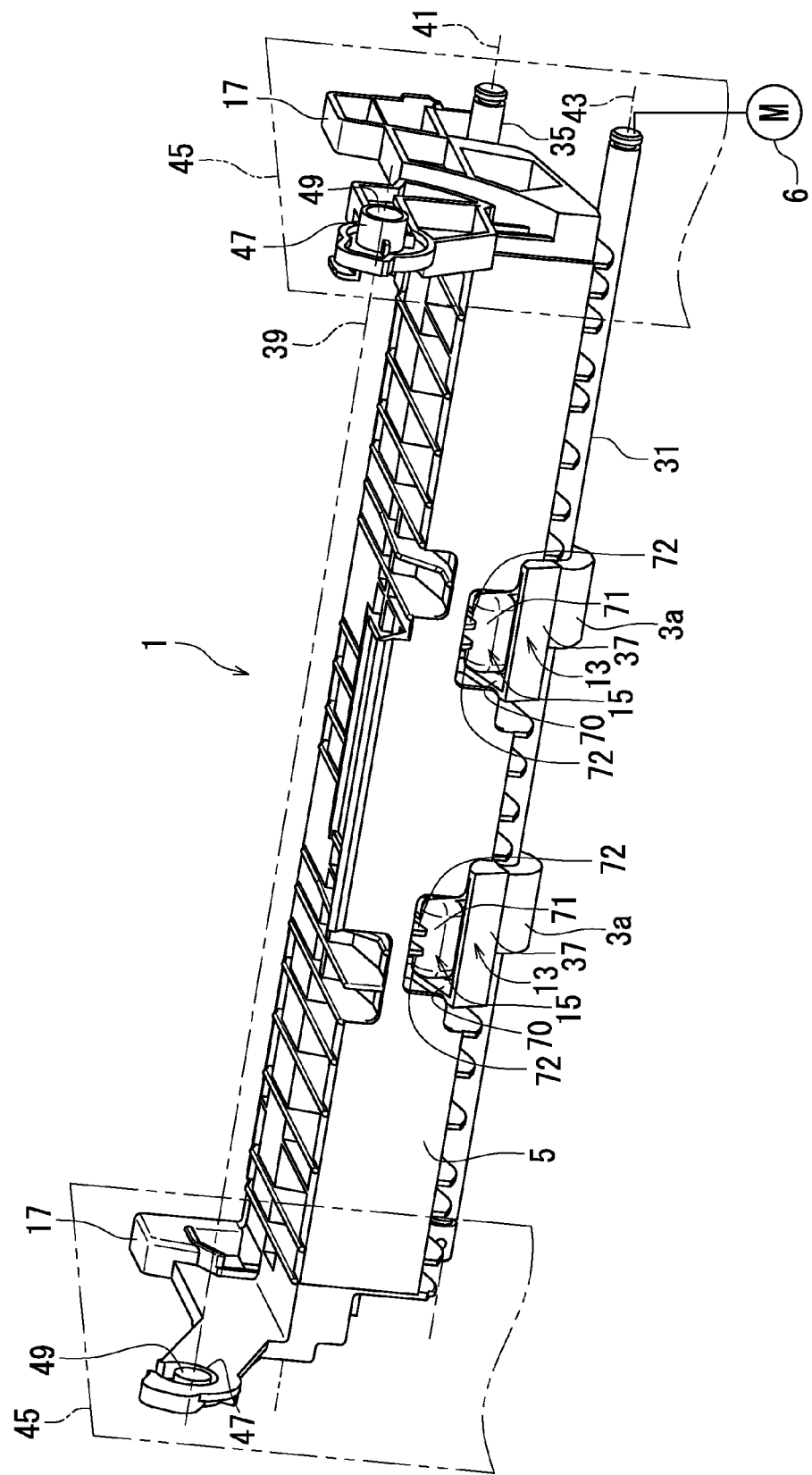
FIG. 10 schematically shows a sheet conveyance section in the first state according to Embodiment 3 of the present invention.
Figure 11:
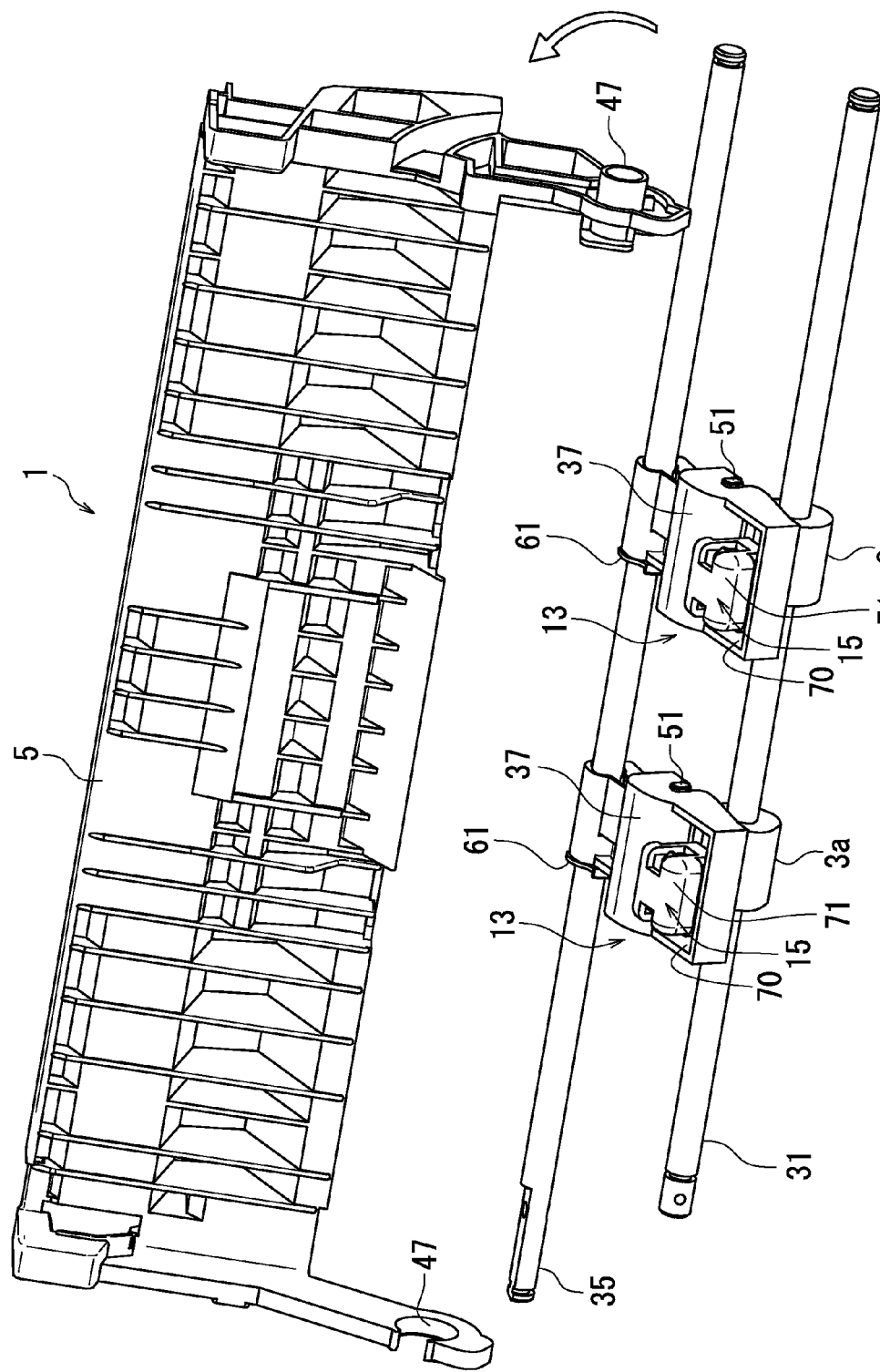
FIG. 11 schematically shows the sheet conveyance section in the second state according to Embodiment 3 of the present invention.
Figure 12:
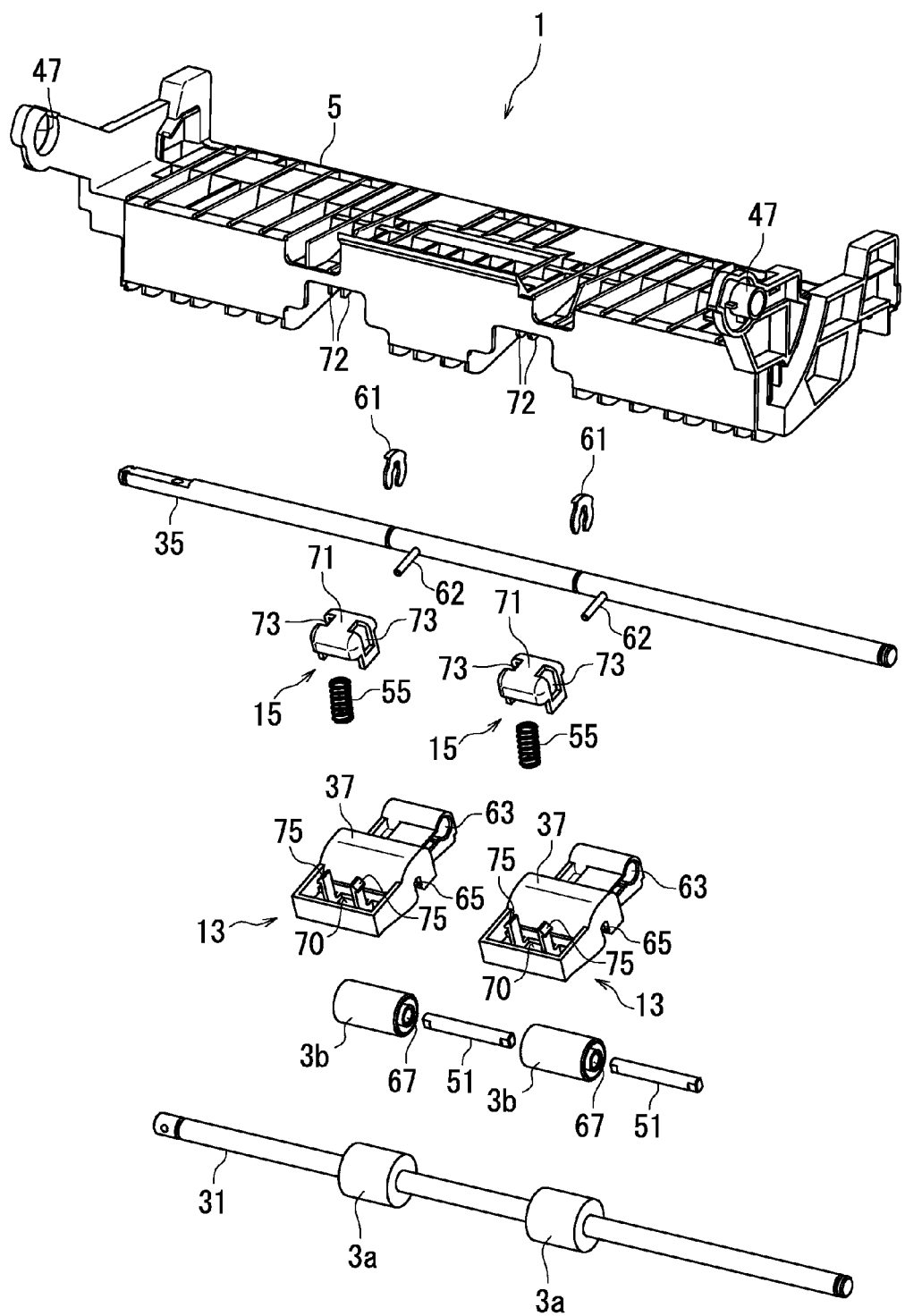
FIG. 12 schematically shows the sheet conveyance section in the third state according to Embodiment 3 of the present invention.

With reference to FIGS. 1A to 4 and 10 to 14, the following describes a conveyance section 1 according to Embodiment 3 of the present invention. FIGS. 10 to 12 each show the conveyance section 1 as viewed obliquely in a direction opposite from the viewing direction of the conveyance section 1 in FIGS. 5 to 7.

In Embodiment 3, a document feeding section 100 includes the conveyance section 1 shown in FIGS. 10 to 14 instead of the conveyance section 1 included in the document feeding section 100 shown in FIGS. 3 and 4. Therefore, similarly to Embodiment 2, the conveyance section 1 is installed as a reversing section in the document feeding section 100 and the rollers 3a are reversing rollers and the rolls 3b are reversing rolls. The pressing member 5 acts as a guide plate.

Major differences between the two embodiments are as follows. In Embodiment 2, the resilient units 15 are disposed on the pressing member 5. In Embodiment 3, however, resilient units 15 are each disposed on a support member 37 (first support member) of a roll unit 13. The following description of Embodiment 3 is directed mainly to differences from Embodiment 2.

[Disposition of Components of Conveyance Section]

Reference is made to FIGS. 10 and 11. FIG. 10 is a perspective view of the conveyance section 1 in the first state. FIG. 11 is a perspective view of the conveyance section 1 in the second state. FIG. 11 omits illustration of a frame 45, a shaft portion 49, a drive source 6, and axes 39, 41, and 43. The conveyance section 1 includes a pressing member 5, a pair of resilient units 15, a pair of roll units 13, a support member 35 (second support member), a pair of rollers 3a, and a shaft 31.

A support member 37 included in each roll unit 13 has a distal end portion provided with a mount portion 70 having a shape of a square tray. The resilient units 15 are disposed inside the respective mount portions 70. The pressing member 5 has abutting portions 72 on a rear surface thereof at positions corresponding to the respective resilient units 15. The resilient units 15 abut against the abutting portions 72.

[Structure of Components of Conveyance Section]

Figure 13:
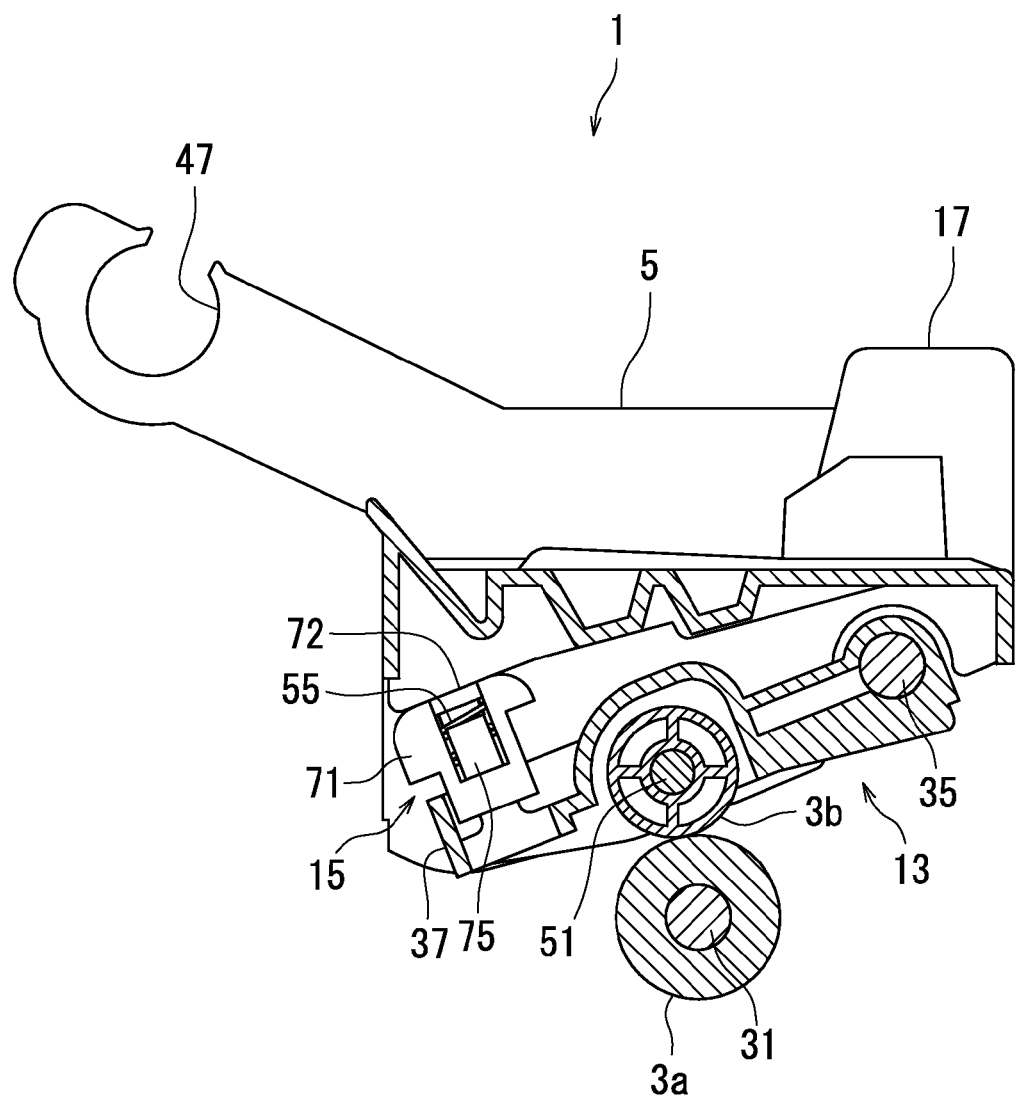
Figure 14:
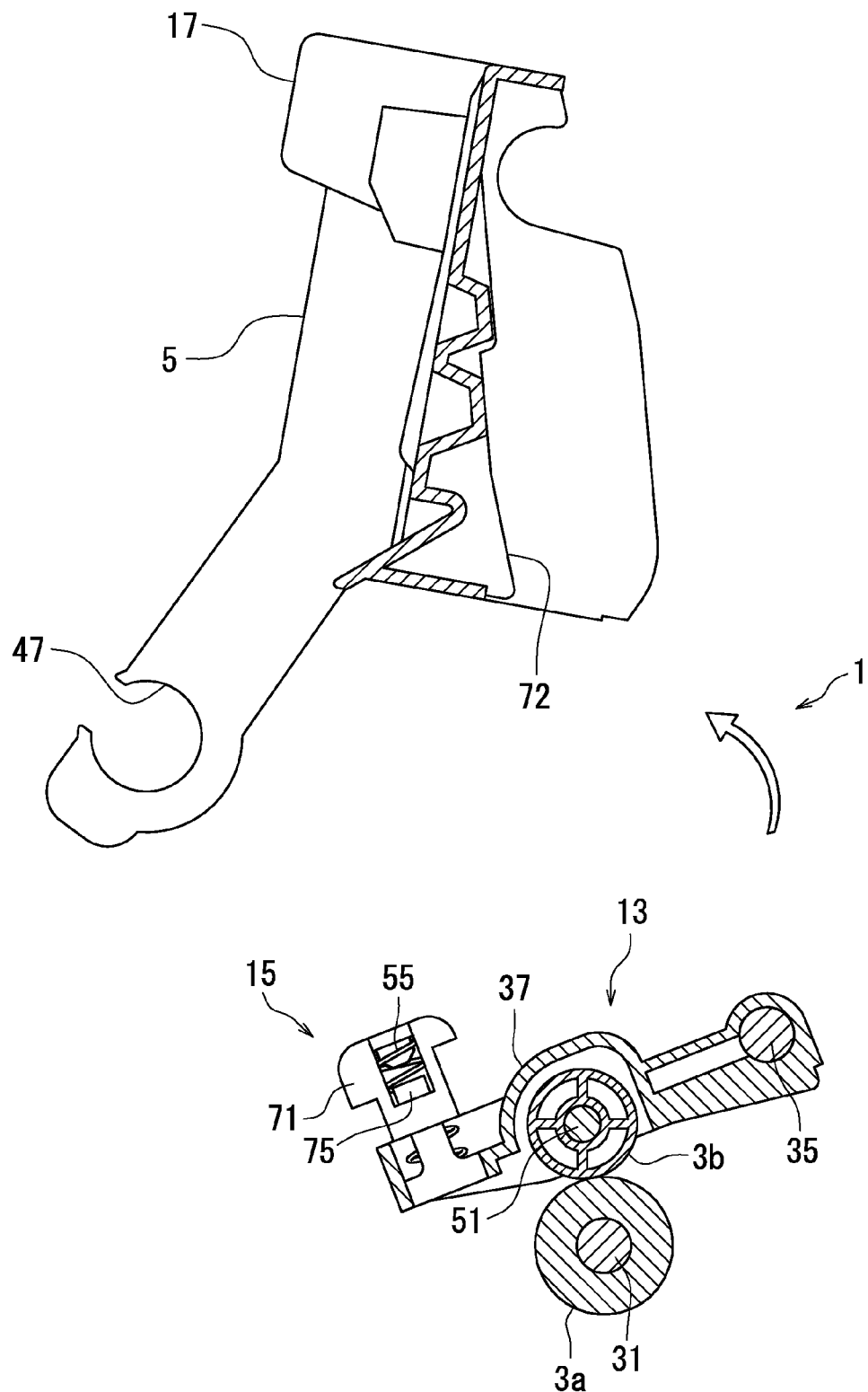

Reference is made to FIGS. 10 to 14. FIG. 12 is an exploded perspective view of the sheet conveyance section 1. FIG. 13 is a longitudinal cross sectional view of the conveyance section 1 in the first state. FIG. 14 is a longitudinal cross sectional view of the conveyance section 1 in the second state. Each resilient unit 15 includes a cap 71 and an elastic object 55. In Embodiment 3, each elastic object 55 is a spring. Each cap 71 has a slot 73 on each side surface.

Each resilient unit 15 is mounted on the support member 37 of a corresponding one of the roll units 13. The mount portion 70 of each support member 37 has two pawls 75 corresponding to the two slots 73. The pawls 75 are inserted into the slots 73 to sandwich the elastic object 55 between the rear side of the cap 71 and the bottom surface of the mount portions 70. In this state, the pawls 75 are inserted into the slots 73 against the elastic force of the elastic object 55 and the tip of each pawl 75 is latched by the cap 71. Therefore, the cap 71 is urged in a direction away from the bottom surface of the mount portions 70. The caps 71 abut against the abutting portions 72 of the pressing member 5.

[First State of Conveyance Section]

Reference is made to FIGS. 4, 10, and 13. In a state where the cover 11 is closed, a projection 19 of the cover 11 abuts against an abutment target portion 17 of the pressing member 5 so as to press the pressing member 5. As a result, the pressing member 5 is set in position that allows the conveyance section 1 to convey a sheet P. Responsively to the pressing by the projection 19, the abutting portions 72 of the pressing member 5 push the caps 71 of the respective resilient units 15. As each cap 71 is pressed, the roll 3b is pressed against the roller 3a by the resilience of the elastic object 55. As a result, each roll 3b can rotate in accompaniment to rotation of the corresponding roller 3a. Although a mechanism for placing the conveyance section 1 into the first state differs from a mechanism used in Embodiment 2, the first state is the same as the first state described in Embodiment 2 with reference to FIGS. 1A, 4, 5, and 8.

[Second State of Conveyance Section]

Reference is made to FIGS. 4, 11, and 14. In a state where the cover 11 is open, the projection 19 is apart from the respective abutment target portions 17 and the pressure applied to the pressing member 5 has been released. In the state immediately after the cover 11 is opened, the caps 71 are still in abutment against the respective abutting portions 72 of the pressing member 5. Consequently, the support members 37 remain pressed by the pressing member 5 under its empty weight. When the pressing member 5 is rotated to move the abutting portions 72 away from the caps 71, the pressing on the support members 37 is released. As a result, the rolls 3b are no longer pressed against the respective rollers 3a. Although a mechanism for placing the conveyance section 1 into the second state differs from a mechanism used in Embodiment 2, the second state is the same as the second state described in Embodiment 2 with reference to FIGS. 1B, 4, 6, and 10.

[Third State of Conveyance Section]

Reference is made to FIG. 14. In the third state, the caps 71 are no longer pressed and therefore the roll units 13 can rotate in accompaniment to rotation of the support member 35. As the roll units 13 rotate, the respective rolls 3b move away from the s. This configuration allows a sheet P to be removed easily when a jam occurs and also allows maintenance to be carried out easily. The third state is the same as the third state described in Embodiment 2 with reference to FIGS. 1C and 9.

As described above with reference to FIGS. 1A to 4 and 10 and 14, the conveyance section 1 according to Embodiment 3 achieves similar functions as the conveyance section 1 according to Embodiment 2. Embodiment 3 therefore achieves the similar effects as archived by Embodiment 2.

(Embodiment 4)

Figure 15:
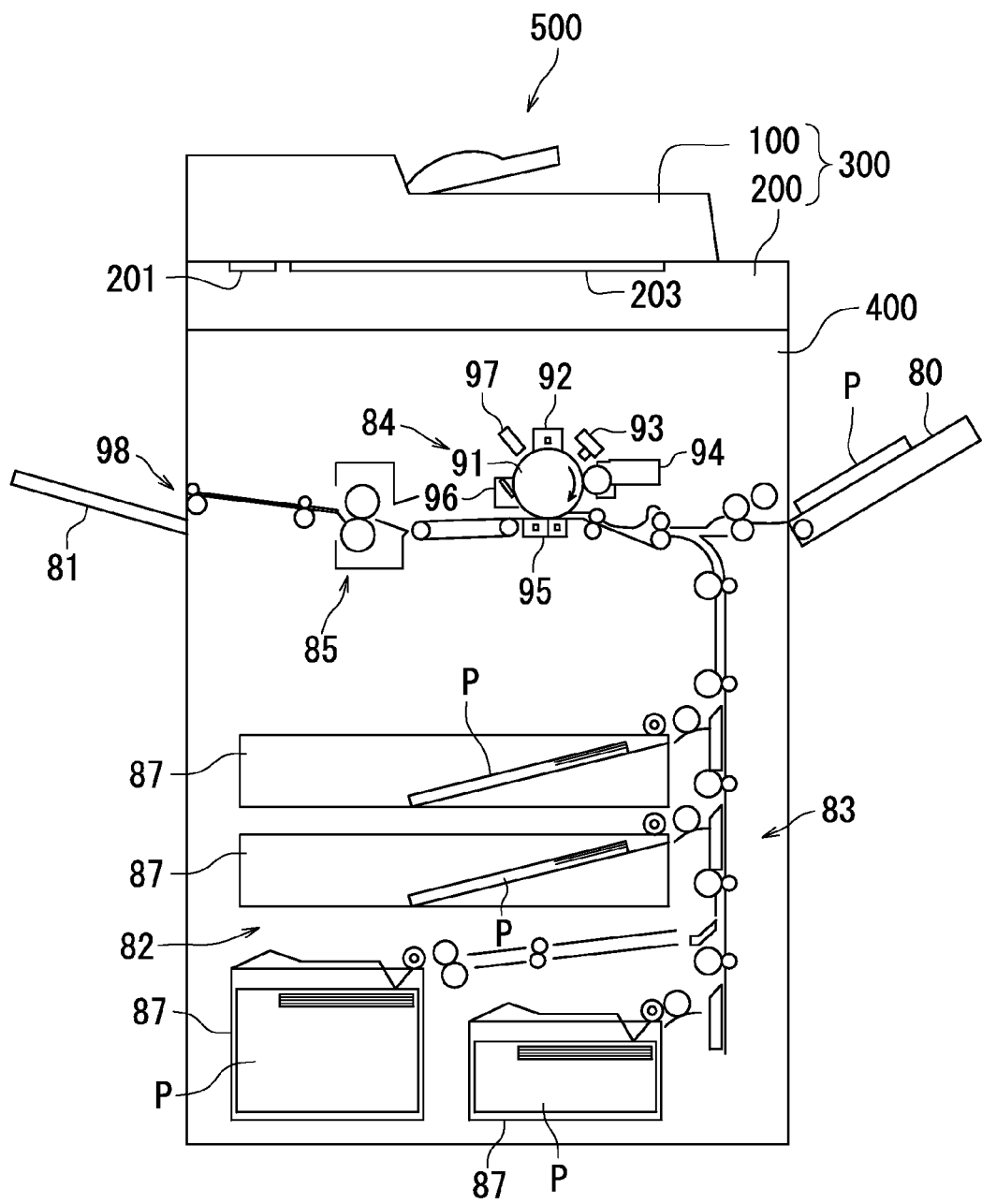
FIG. 15 is a schematic cross sectional view for illustrating an overview of an image forming apparatus according to Embodiment of 4 of the present invention.

With reference to FIGS. 2 to 15, the following describes an image forming apparatus 500 according to Embodiment 4 of the present invention. FIG. 15 is a schematic cross sectional view for illustrating an overview of the image forming apparatus 500. The image forming apparatus 500 is for example a multifunction peripheral that combines the functions of a copier, a printer, and/or a facsimile machine or alternatively is a copier, a printer, or a facsimile machine.

The image forming apparatus 500 includes a document feeding section 100, an image reading section 200, and an image forming section 400. The document feeding section 100 includes the conveyance section 1 according to Embodiment 2 or the conveyance section 1 according to Embodiment 3.

The image reading section 200 includes contact glass 201 and contact glass 203. The image reading section 200 reads an image of a sheet P through the contact glass 201 or the contact glass 203 to generate image data. In one example, the image reading section 200 reads an image of a sheet P conveyed by the conveyance section 1 through the contact glass 201 and generates image data.

The image forming section 400 forms an image on a sheet P fed from a paper feed cassette 87 or a manual feed tray 80 based on image data generated by the image reading section 200. More specifically, the image forming section 400 includes a fixing unit 85, an image forming unit 84, a conveyance unit 83, and a paper feed unit 82.

The paper feed unit 82 includes the paper feed cassette 87 and the manual feed tray 80. The paper feed cassette 87 stores sheets P. The manual feed tray 80 is manually loaded with a sheet P. A sheet P is fed from the paper feed cassette 87 or the manual feed tray 80 to the conveyance unit 83.

The conveyance unit 83 conveys the sheet P to the image forming unit 84. The image forming unit 84 forms an image on the sheet P in the following manner. The image forming unit 84 includes a photosensitive member 91, a charging section 92, an exposure section 93, a developing section 94, a transfer section 95, a cleaning section 96, and a static eliminating section 97.

The charging section 92 charges a surface of the photosensitive member 91. The exposure section 93 directs light to the surface of the photosensitive member 91 according to the image data generated by the image reading section 200. As a result, an electrostatic latent image is formed on the surface of the photosensitive member 91.

The developing section 94 develops the electrostatic latent image formed on the photosensitive member 91 into a toner image. As a sheet S is conveyed to a location between the photosensitive member 91 and the transfer section 95, the transfer section 95 transfers the toner image to the sheet P.

The sheet P having the toner image transferred thereto is conveyed to the fixing unit 85. The fixing unit 85 applies heat and pressure to the sheet P to fix the toner image on the sheet P. A pair of ejection rollers 98 ejects the sheet P onto an exit tray 81.

The cleaning section 96 removes residual toner from the surface of the photosensitive member 91. The static eliminating section 97 eliminates the residual charge from the surface of the photosensitive member 91.

As has been described with reference to FIGS. 2 to 15, Embodiment 4 provides the image forming apparatus 500 that includes the conveyance section 1 according to Embodiment 2 or 3. Embodiment 4 therefore achieves the similar effects as those achieved by Embodiment 2 or 3.

The present invention is not limited to the embodiments described above and may be practiced in various manners within a scope not departing from the essence thereof.

INDUSTRIAL APPLICABILITY

The present invention is applicable to the field of document feeding devices and image forming apparatuses in which occurrence of a jam is possible.

The invention claimed is:

1. A sheet conveyance device comprising:
   a drive roller and a follower roller configured to convey a sheet by sandwiching the sheet therebetween;
   a pressing member that presses the follower roller against the drive roller;
   a first support member configured to rotatably support the follower roller;
   a resilient unit disposed between the pressing member and the first support member and configured to urge the follower roller toward the drive roller responsively to the pressing by the pressing member; and a second support member configured to support the first support member to allow the first support member to move away from the drive roller with the follower roller remaining supported on the first support member in the state in which the pressing by the pressing member is released, wherein the follower roller is supported so as to be movable independently of the pressing member in a state in which the pressing by the pressing member is released, the resilient unit is disposed on the pressing member, the pressing member has a rear surface with a mount portion formed thereon, the resilient unit is disposed on the mount portion, the resilient unit includes an elastic object and an abutting portion, the abutting portion is urged by the elastic object in a direction away from the rear surface of the pressing member to abut against the first support member at a distal end portion of the first support member, the first support member has a based end portion with a shaft hole formed therethrough, the second support member is a support shaft, and the second support member is disposed though the shaft hole of the first support member.

2. The sheet conveyance device according to claim 1, wherein the pressing member is rotatable about a first axis, and the second support member supports the first support member so as to allow rotation of the first support member about a second axis.

3. The sheet conveyance device according to claim 1, wherein the second support member and the drive roller are in a fixed positional relation relative to each other.

4. The sheet conveyance device according to claim 1, wherein the drive roller is a roller configured to reverse the sheet.

5. The sheet conveyance device according to claim 1, wherein the pressing member is a member configured to guide the sheet.

6. A sheet conveyance device comprising:

a drive roller and a follower roller configured to convey a sheet by sandwiching the sheet therebetween;

a pressing member that presses the follower roller against the drive roller;

a first support member configured to rotatably support the follower roller;

a resilient unit disposed between the pressing member and the first support member and configured to urge the follower roller toward the drive roller responsively to the pressing by the pressing member; and a second support member configured to support the first support member to allow the first support member to move away from the drive roller with the follower roller remaining supported on the first support member in the state in which the pressing by the pressing member is released, wherein the follower roller is supported so as to be movable independently of the pressing member in a state in which the pressing by the pressing member is released, the resilient unit is disposed on the first support member, the first support member has a distal end portion with a mount portion formed therein, the resilient unit is disposed on the mount portion, the resilient unit includes an elastic object and a cap, the cap is urged in a direction away from a bottom surface of the mount portion, the pressing member has a rear surface on which an abutting portion is formed for abutment with the cap, the first support member has a base end portion with a shaft hole formed therethrough, the second support member is a support shaft, and the second support member is disposed through the shaft hole of the first support member.

7. The sheet conveyance device according to claim 1, wherein the first support member has a size commensurate with the drive roller.

8. An image reading device comprising:

the sheet conveyance device according to claim 1; and an image reading section configured to read an image of a sheet conveyed by the sheet conveyance device.

9. An image forming apparatus comprising:

the sheet conveyance device according to claim 1; and an image forming section configured to form an image on a sheet conveyed by the sheet conveyance device.

10. An image reading device comprising:

the sheet conveyance device according to claim 6; and an image reading section configured to read an image of a sheet conveyed by the sheet conveyance device.

11. An image forming apparatus comprising:

the sheet conveyance device according to claim 6; and an image forming section configured to form an image on a sheet conveyed by the sheet conveyance device.

* * * * *